(12) United States Patent
Pham et al.

(10) Patent No.: US 12,399,307 B2
(45) Date of Patent: Aug. 26, 2025

(54) LIGHT CONTROL SHEET

(71) Applicant: 3M INNOVATIVE PROPERTIES COMPANY, St. Paul, MN (US)

(72) Inventors: Tri D. Pham, Woodbury, MN (US); Corey D. Balts, Eau Claire, WI (US); Raymond J. Kenney, Woodbury, MN (US); Michael J. Wayne, Durrand, WI (US); Brian L. Oldfield, Eau Claire, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 603 days.

(21) Appl. No.: 16/763,818

(22) PCT Filed: Dec. 26, 2018

(86) PCT No.: PCT/IB2018/060620
§ 371 (c)(1),
(2) Date: May 13, 2020

(87) PCT Pub. No.: WO2019/130217
PCT Pub. Date: Jul. 4, 2019

(65) Prior Publication Data
US 2020/0386920 A1    Dec. 10, 2020

Related U.S. Application Data

(60) Provisional application No. 62/612,118, filed on Dec. 29, 2017.

(51) Int. Cl.
G02B 5/02 (2006.01)
G02B 5/00 (2006.01)
(Continued)

(52) U.S. Cl.
CPC ........... *G02B 5/0257* (2013.01); *G02B 5/003* (2013.01); *G02B 5/045* (2013.01);
(Continued)

(58) Field of Classification Search
CPC ...... G02B 5/0257; G02B 5/003; G02B 5/045; G02B 2207/123; G02F 1/133524;
(Continued)

(56) References Cited

U.S. PATENT DOCUMENTS 7,467,873 B2   12/2008   Clarke
8,213,082 B2   7/2012    Gaides
(Continued)

FOREIGN PATENT DOCUMENTS

WO   WO-2016003669 A1 *  1/2016  ............... G02B 1/04
WO   WO 2018-130926      7/2018

OTHER PUBLICATIONS

Magic film factory; How does PDLC film Work; May 28, 2023; https://www.magic-film.com/how-does-pdlc-film-work/pp. 1-3 (Year: 2023).*

(Continued)

*Primary Examiner* — Mihir K Rayan
(74) *Attorney, Agent, or Firm* — Robert S. Moshrefzadeh

(57) ABSTRACT

A light control sheet having opposing first and second major faces and an internal array of disruptive optical interfaces, wherein the light control sheet is light transmissive such that an image incident to one of the major faces is visible from the other major faces within a field of view which is perpendicular to the major faces but wherein the image is obscured outside the field of view.

11 Claims, 3 Drawing Sheets

(51) Int. Cl.
- *G02B 5/04* (2006.01)
- *G02F 1/1335* (2006.01)
- *H04N 13/31* (2018.01)
- *H04N 13/312* (2018.01)
- *H04N 13/30* (2018.01)

(52) U.S. Cl.
CPC .. *G02F 1/133524* (2013.01); *G02B 2207/123* (2013.01); *G02F 1/133562* (2021.01); *G09G 2320/068* (2013.01); *H04N 13/31* (2018.05); *H04N 13/312* (2018.05); *H04N 2013/40* (2018.05)

(58) Field of Classification Search
CPC ........ G02F 1/133562; G09G 2320/068; H04N 13/31; H04N 13/312; H04N 2013/40
See application file for complete search history.

(56) References Cited

U.S. PATENT DOCUMENTS

| | | | |
|---|---|---|---|
| 8,503,122 B2 | 8/2013 | Liu | |
| 9,063,284 B2 | 6/2015 | Jones | |
| 9,229,253 B2* | 1/2016 | Schwartz | B32B 3/30 |
| 9,568,650 B2 | 2/2017 | Hwang | |
| 9,568,651 B2* | 2/2017 | Tsuji | G02B 5/0278 |
| 10,019,052 B2* | 7/2018 | Lee | G06F 3/01 |
| 11,199,652 B2* | 12/2021 | McCoy | G06V 40/10 |
| 2007/0084549 A1 | 4/2007 | Graham | |
| 2010/0175837 A1* | 7/2010 | You | G06F 1/1686 |
| | | | 160/371 |
| 2010/0201242 A1* | 8/2010 | Liu | G02B 5/0263 |
| | | | 313/112 |
| 2010/0271721 A1* | 10/2010 | Gaides | G02B 5/045 |
| | | | 359/885 |
| 2010/0302479 A1 | 12/2010 | Aronson | |
| 2011/0310463 A1 | 12/2011 | Nomura | |
| 2015/0009563 A1 | 1/2015 | Lauters | |
| 2015/0293272 A1 | 10/2015 | Pham | |
| 2016/0146982 A1 | 5/2016 | Boyd | |
| 2016/0216420 A1* | 7/2016 | Gaides | G02B 5/0263 |
| 2017/0108628 A1* | 4/2017 | Larsen | G02B 5/00 |

OTHER PUBLICATIONS

International Search Report for PCT International Application No. PCT/IB2018/060620, mailed on May 8, 2019, 4 pages.

* cited by examiner

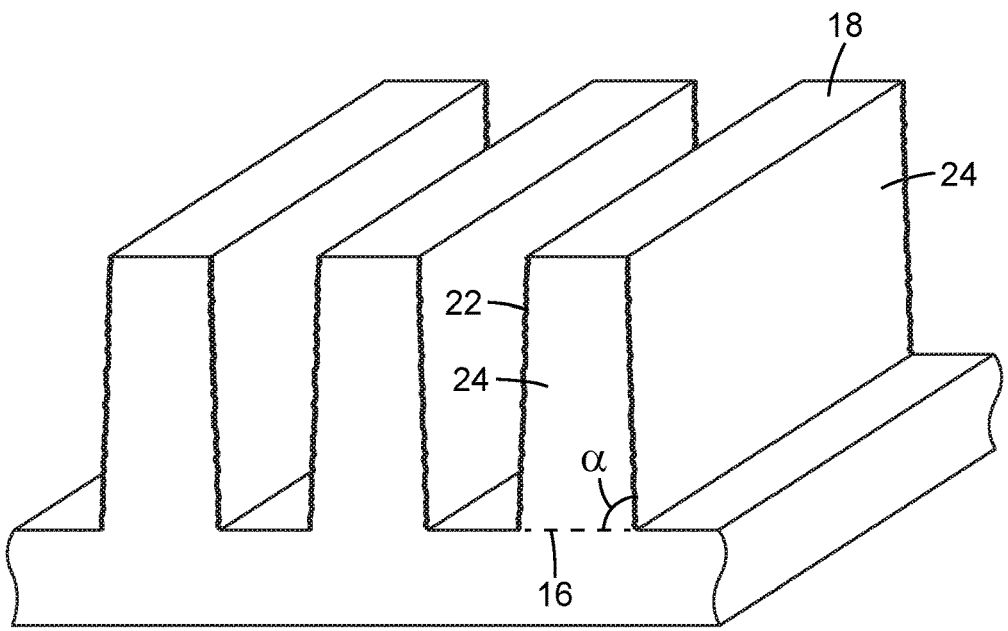
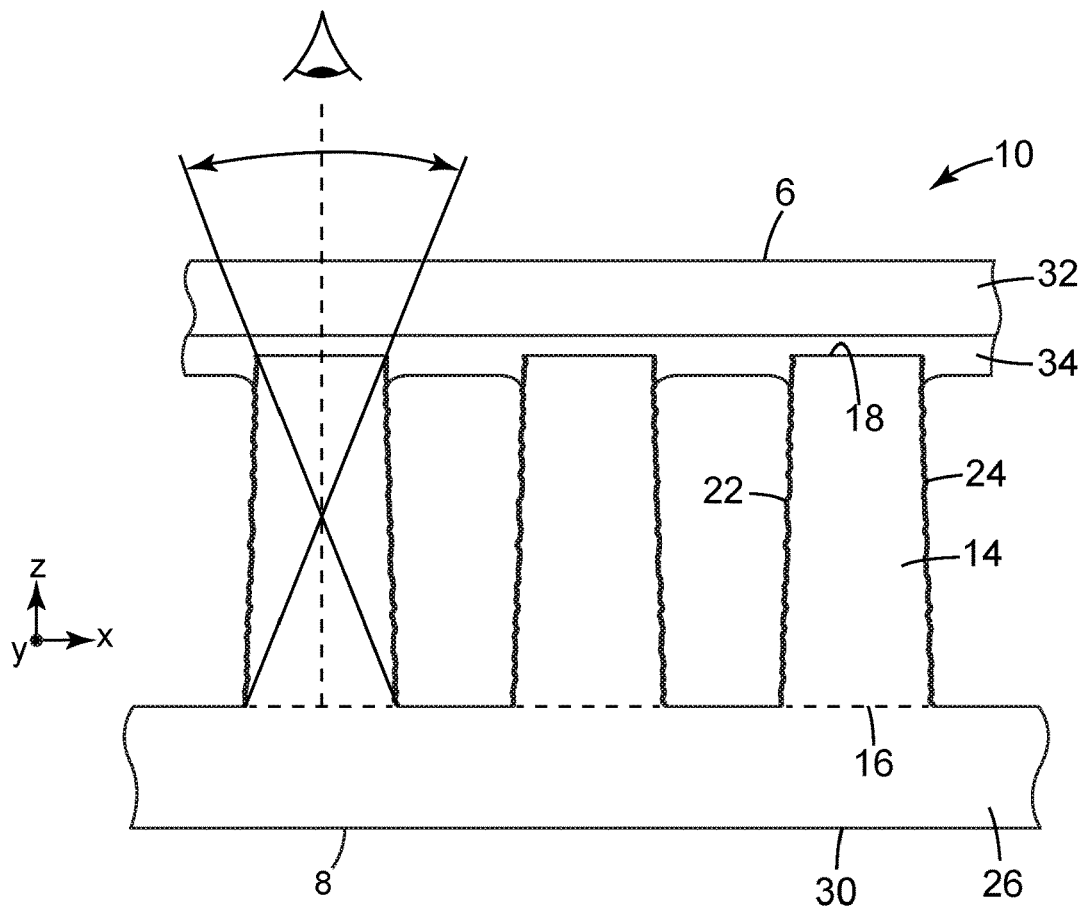
Fig. 4
Fig. 5

LIGHT CONTROL SHEET

CROSS REFERENCE TO RELATED APPLICATIONS

This application is a national stage filing under 35 U.S.C. § 371 of PCT/IB2018/060620, filed Dec. 26, 2018, which claims the benefit of Provisional Application No. 62/612,118, filed Dec. 29, 2017, the disclosure of which is incorporated by reference in its/their entirety herein.

FIELD

The present invention relates to light control sheets, in particular light control sheets which provide angle-dependent image transmission and articles incorporating same.

BACKGROUND

Flat panel displays are widely used as information display devices on mobile devices such as mobile phones, personal digital assistances (PDAs), notebook computers, and other handheld devices, as well as on devices used in fixed locations such as desk top and wall mounted monitors, automated teller machines (ATMs), electronic security touch screens, and the like. In many instances, it is desirable that information on the device be visible to the user but protected from viewing by bystanders (e.g., persons sitting adjacent the user in a vehicle or at a desk). A variety of light control products, often referred to as privacy films, are known for such purposes. These products are designed to limit the effective field of view at which the image or information on the device may be viewed to a field likely to be occupied only by the intended user (e.g., typically looking straight on or at a substantially perpendicular angle to the device), while obscuring the appearance of the image or information to persons outside the intended field of view (for instance, looking at the device from the side such that the field of view is at an angle rather than being substantially perpendicular to the device).

Such products typically function to restrict the angle of view from which a display or the information presented thereon may be view. Illustrative examples of known view angle-restricting sheets are disclosed in U.S. Pat. No. 7,467,873 (Clarke et al.), U.S. Pat. No. 8,213,082 (Gaides et al.), U.S. Pat. No. 8,503,122 (Liu et al.), U.S. Pat. No. 9,063,284 (Jones et al.), U.S. Pat. No. 9,568,650 (Tsuji), and U.S. Pat. No. 9,568,651 (Tsuji).

There are several deficiencies to known privacy films including cost and effectiveness. In common embodiments, privacy films utilize comprise oriented high aspect opaque elements or features to achieve limitation of viewing angle, but such elements tend to reduce the effective brightness of the view to the intended user. As a result, the user must accept dimmer visibility of information and images or higher power illumination (with attendant increased energy demand) must be used to overcome such dimmer visibility.

The need exists for improved privacy films.

SUMMARY

The present invention provides novel light control sheets (sometimes referred to as films) which provide surprising and heretofore unattained light management properties. Light control sheets of the invention provide a heretofore unattained combination of effective control of field of view coupled with increased brightness to intended users.

In brief summary, the present invention provides light control sheets having opposing first and second major faces, the first and second major faces being substantially parallel to one another and connected by a perimeter edge. The light control sheet has an internal an array of disruptive optical interfaces. The disruptive optical interfaces are each generally planar, defining a longitudinal axis and a transmission axis. The longitudinal axis of a disruptive optical interface is parallel to the longitudinal axes of other disruptive optical interfaces, and the transmission axis of a disruptive optical interface is not perpendicular to the first and second major faces of the light control sheet. The light control sheet is light transmissive such that an image incident to one of the major faces is visible from the other major faces within a field of view which is perpendicular to the major faces but wherein the image is obscured outside the field of view.

In some embodiments, the light control sheet comprises an array of a plurality of optical elements, wherein the optical elements:
(1) have an elongate form with opposing first and second base sides and two opposing lateral sides, each lateral side connecting the first base side and the second base side of the optical element and each lateral side defining a disruptive optical interface;
(2) are light transmissive between the first base side and the second base side;
(3) are disposed in substantially parallel arrangement to one another within the array such that adjacent optical elements are spaced apart from adjacent optical elements by a separation gap having opposing first and second base sides and two opposing lateral sides, each lateral side connecting the first base side and second base side of the separation gap.

BRIEF DESCRIPTION OF THE DRAWINGS

The invention is further explained with reference to the drawing wherein:

FIG. 4 is a perspective view of a portion of the light control film of FIG. 3; and FIG. 5 is a schematic diagram illustrating the optical effect on transmitted light imparted by illustrative embodiments of light control films of the invention.

Figure 1:
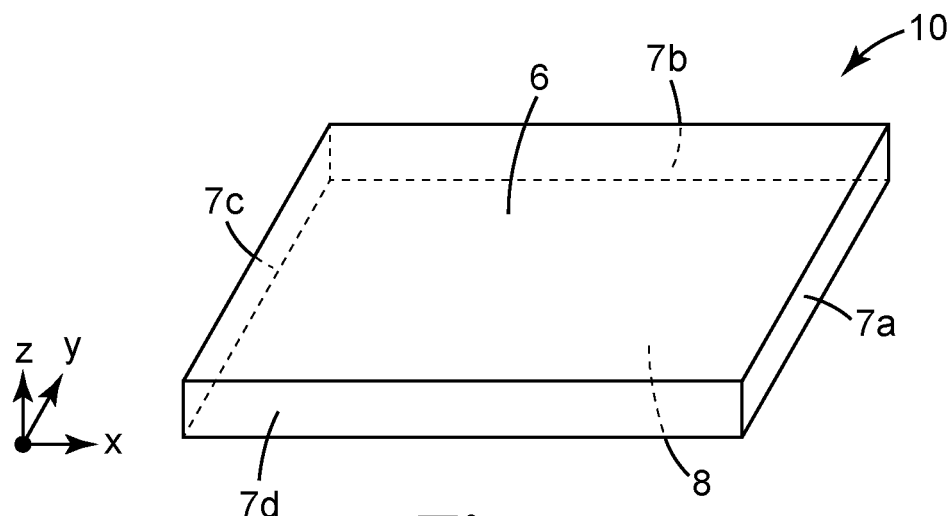
FIG. 1 is a perspective view of a portion of an illustrative embodiment of light control film of the invention.

These figures are not to scale and are intended to be merely illustrative and not limiting. Like symbols in the drawings indicate like elements. Dashed lines indicate components or features out of view. An x, y, and z orientation key is included in several of the Figures to facilitate understanding the various orientations shown in different Figures.

DETAILED DESCRIPTION OF ILLUSTRATIVE EMBODIMENTS

It will be understood that any claimed embodiment of the invention does not necessarily include all of the features of all of the embodiments described herein.

Referring to FIG. 1, as discussed above, in accordance with the present invention a light control sheet 10 has opposing first major face 6 and second major face 8. The first and second major faces are substantially parallel to one another and connected by a perimeter edge. In the embodiment shown, the perimeter edge is made up of perimeter edge segments 7a, 7b, 7c, and 7d.

The light control sheet shown in FIG. 1 has a generally rectilinear shape with the perimeter edge being made up of 4 edge segments. It will be understood that light control sheets of the invention may be made in any desired shape (e.g., other regular or irregular polyhedron, circular, oval, ovate, etc.). An optimal size and shape will typically be dependent in part upon the intended application, for instance of a size and shape which corresponds to the display of a device with which the light control sheet will be used.

Figure 2A:
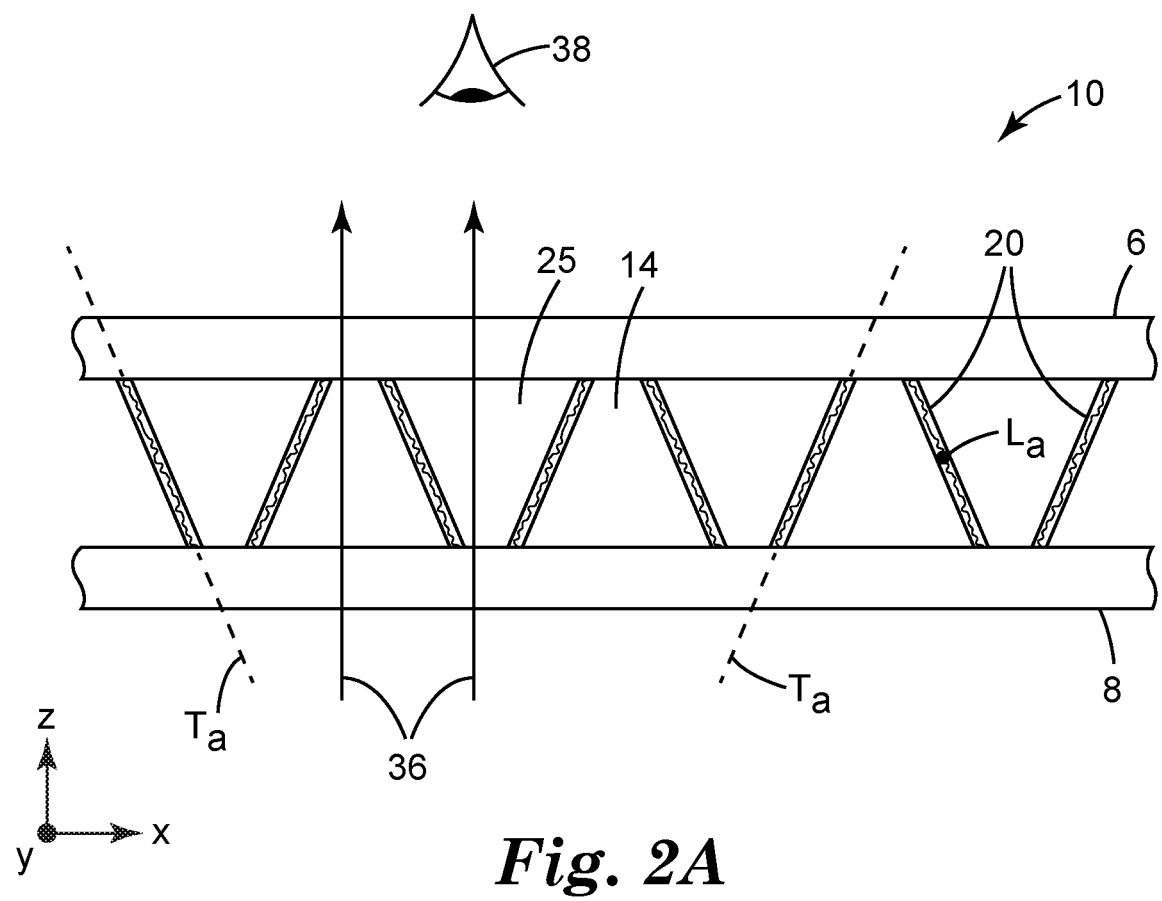
FIGS. 2A and 2B are cross sectional schematics of a portion an illustrative embodiment of light control film of the invention illustrating its utility.
Figure 2B:
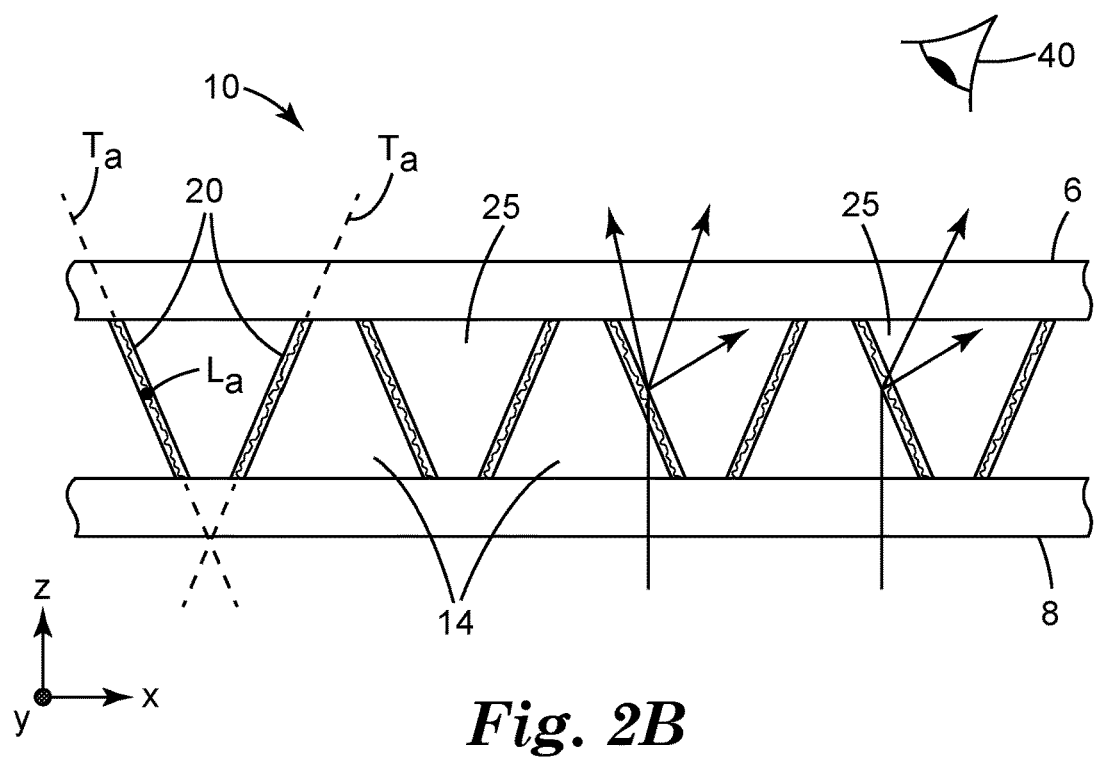

Referring to FIGS. 2A and 2B, light control sheet 10 has an internal an array of disruptive optical interfaces 20. The disruptive optical interfaces are each generally planar, defining a longitudinal axis $L_a$ and a transmission axis $T_a$. In FIGS. 2A and 2B, the longitudinal axes $L_a$ are parallel to the y-axis of the view, and the transmission axes $T_a$ extend generally through light control sheet 10 passing through both first major face 6 and second major face 8.

The longitudinal axis of a disruptive optical interface is parallel to the longitudinal axes of other disruptive optical interfaces, and the transmission axis of a disruptive optical interface is not perpendicular to the first and second major faces of the light control sheet. The light control sheet is light transmissive such that an image incident to one of the major faces is visible from the other major faces within a field of view which is perpendicular to the major faces but wherein the image is obscured outside the field of view. Such utility is shown in FIG. 2A where light rays 36 (e.g., the image or information displayed on display screen (not shown) a device such as a lap top computer, cell phone, etc.) are largely transmitted through light control sheet 10 so as to be visible to user 38.

As shown in FIG. 2B, however, at an orientation such as that of bystander 40 outside the field of view, a significant portion of light rays 36 intersect disruptive optical interfaces 20 such that the overall light transmission is disrupted with a large portion of the light rays being randomly redirected such that the resultant collective emission of light rays from light control sheet 10 to bystander 40 is degraded such that resultant view if blurred and otherwise degraded so as to be illegible.

In some embodiments, as seen in the Figures, light control 10 sheet comprises an array of a plurality of optical elements 14, wherein the optical elements have an elongate form with opposing first and second base sides 16, 18 and two opposing lateral sides 22, 24, each lateral side connecting the first base side and the second base side of the optical element and each lateral side defining a disruptive optical interface 20. Optical elements 14 are separated by separation gap 25.

The optical elements are light transmissive, and preferably highly transparent and clear, between their first and second base sides. In some embodiments, the optical elements are of substantially uniform size and shape so as to provide uniform performance across the width of the light control sheet (i.e., in its x-y perspective as shown in Figs.)

The optical elements are disposed in substantially parallel arrangement to one another within the array such that adjacent optical elements are spaced apart from adjacent optical elements by a separation gap having opposing first and second base sides and two opposing lateral sides, each lateral side connecting the first base side and second base side of the separation gap. The boundary of each optical element with adjoining separation gap defines the disruptive optical interface.

The separation gaps may be resin filled or may empty (e.g., air or gas filled). To achieve desired optical performance in light control sheets of the invention, the boundary between the lateral side of the optical element adjoining separation gap is preferably of distinctive refractive index.

The separation gaps are light transmissive, and preferably highly transparent and clear, between their first and second base sides. In some embodiments, the separation gaps are of substantially uniform size and shape so as to provide uniform performance across the width of the light control sheet (i.e., in its x-y perspective as shown in Figs.).

With high transmissivity of the optical elements and separation gaps, light rays from an image will largely pass through the light control sheet so as to be visible to an intended user. Unlike privacy films which utilize opaque features, light control sheets of the invention can exhibit high brightness and gain, thereby enabling more efficient use of energy in devices in which they are incorporated (for instance, resulting in longer battery life).

In typical embodiments, the lateral surfaces of the optical elements are microstructured with a plurality of preferably randomly distributed structures across a reference plane defined by the side of the optical element. Illustrative examples of microstructures and methods for making them which are suitable for use in the present invention are described in PCT Publication No. WO2018/130926, which is assigned to the same assignee as this application and which is incorporated herein by reference in its entirety.

Figure 3:
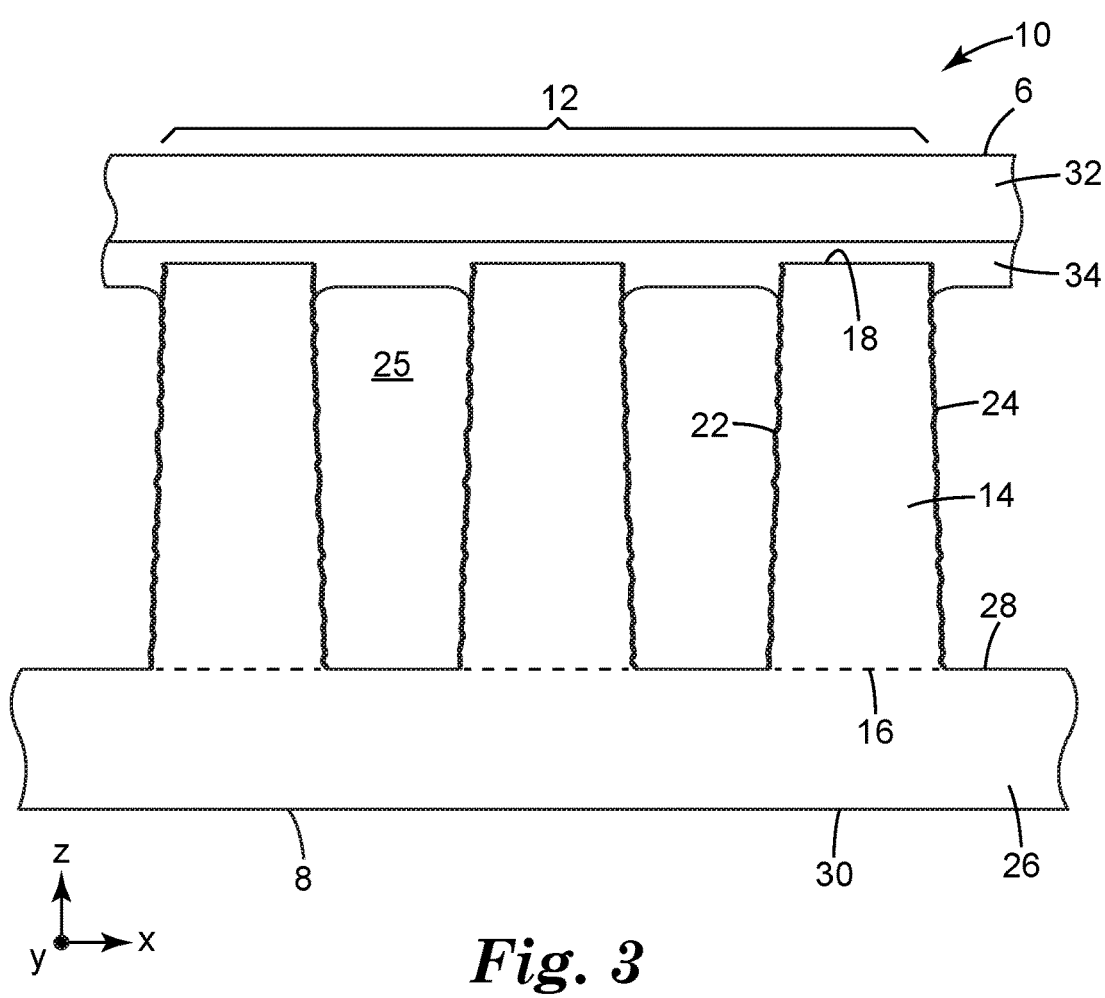
FIG. 3 is a schematic cross section of an illustrative embodiment of light control film of the invention.

FIGS. 3 and 3 show an illustrative embodiment of a sheet of the invention. Light control sheet 10 comprises array 12 of a plurality of optical elements 14. Optical elements 14 have an elongate form with opposing first base side 16 and second base side 18 and two opposing lateral sides 20, 22. In this embodiment, the optical elements are trapezoidal in shape. In the case of optical elements which are regular trapezoids (i.e., the opposing lateral sides are equal in size with equivalent included angles to the opposing base sides), the resultant field of view will be perpendicular to a major face of the sheet. If the optical elements are not regular trapezoids, the resultant field of view will be canted accordingly.

Lateral sides 20, 22 each connect first base side 16 and second base side 18. The first base sides 16 define a plane parallel to and oriented to one major face of the sheet and the second base sides 18 define another plane parallel to and oriented to the other major face of the sheet.

Light control sheets of the invention may be made in desired size and of desired field of view. In an illustrative example, for instance, the first base side of the optical elements may be on the order of 50 μm wide (i.e., dimension in x-axis orientation in Figs.), with the second base side on the order of 42 μm wide (i.e., dimension in x-axis orientation in Figs.), with about 42 μm wide spacing between adjacent first base sides, and height (i.e., distance from first base side to second base side) of about 130 μm. At such dimensions (e.g., resulting in included angles α at the intersection of first base sides as shown in FIG. 4), the resultant light control sheet will provide a field of view of about 39° which is perpendicular to the first major surface of the light control sheet.

In this embodiment, sheet 10 further comprises base member 26 having first major side 28 and second major side 30. Optical elements 14 are disposed on base member 26 with first base sides 16 on first major side 28.

In some embodiments, base member 26 will be oriented toward the display of a device (not shown) such as disposed in desired position with a frame or even adhered directly thereto with adhesive (e.g., optically clear adhesive). Alternatively, the light control film may be used in reverse configuration with the base member 26 side facing the user and the opposing side of the light control sheet being oriented toward the display of a device.

The boundary where the first base side 16 of the optical elements is connected to base member 26 is preferably optically coupled to facilitate efficient transmission of light therethrough. In some embodiments, base member 26 and optical elements 14 are formed as an integral member; in other embodiments they are formed separately and then conjoined. The arrangement of optical elements 14 defines separation gaps 15.

As shown in FIGS. 3 and 4, sheet 10 further comprises protective layer 32 which is bonded via adhesive 34 to optical elements 14. Provision of protective layer 32 forms a major face of the light control sheet and seals separation gaps 25 and optical elements 14 which define disruptive optical interfaces therebetween.

Protective layer 32 can be optimally selected for desired properties, such as abrasion resistance, impact and scratch resistance, staining and dirt resistance (or alternatively receptivity to fixed imaging materials such as paints, inks, and the like).

The optical elements are light transmissive at least in an axis between first base side 16 and second base side 18.

Those skilled in the art will be able to readily select suitable materials for use in light control sheets of the invention. Light control sheets of the invention, and separate components thereof may have a composition suitable for use in an optical product designed to control the flow of light. Factors and properties for use herein may include sufficient optical clarity and structural strength so that, for example, the resultant light control film may be assembled into or used within a particular optical product and may have sufficient resistance to temperature and aging such that performance of the optical product is not compromised over time. The particular chemical composition and thickness for any light component sheet or constituent component thereof may depend on the requirements of the particular application for which the light control sheet of the invention that is being constructed (e.g., balancing the needs for strength, clarity, temperature resistance, surface energy, adherence to other films.

Illustrative examples of useful materials may include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly(methylmethacrylate) (PMMA) and PMMA copolymers; ethoxylated and propoxylated (meth)acrylates; multifunctional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly (dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly (alkane napthalates), such as poly(ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers, including polyolefinic PET and PEN; and poly(carbonate)/aliphatic PET blends.

As will be understood, different components of the light control sheet (e.g., the optical elements, the separation gap if filled, protective layer, base member, etc.) may separately selected to optimize overall effects of the sheet.

REFERENCE NUMBER KEY

The following reference numbers are used in the drawing:

| Reference No. | Feature |
| --- | --- |
| 6 | First major side of light control sheet |
| 8 | Second major side of light control sheet |
| 10 | Light control sheet |
| 12 | Array of optical elements |
| 14 | Optical element |
| 16 | First base side of optical element |
| 18 | Second base side of optical element |
| 20 | Disruptive optical interface |
| 22 | Lateral side of optical element |
| 24 | Lateral side of optical element |
| 25 | Separation gap |
| 26 | Base member |
| 28 | First major side of base member |
| 30 | Second major side of base member |
| 32 | Protective layer |
| 34 | Adhesive |
| 36 | Light rays |
| 38 | User |
| 40 | Bystander |

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

The invention claimed is:

1. A light control sheet having opposing first and second major faces, the first and second major faces being substantially parallel to one another and connected by a perimeter edge, and the light control sheet having a plurality of optically transmissive optical elements, each pair of adjacent optically transmissive optical elements forming a generally planar surface interface therebetween resulting in an internal array of generally planar surface interfaces, wherein each generally planar surface interface extends along a longitudinal axis that is parallel to the opposing first and second major faces from a first location on the perimeter edge to an opposite second location on the perimeter edge, and extends along a transmission axis from the first major face to the second major face, wherein the longitudinal axis is parallel to the longitudinal axis of other disruptive optical interfaces, and the transmission axis is not perpendicular to the first and second major faces of the light control sheet, and the light control sheet is light transmissive such that an image incident to one of the major faces is visible from the other major faces within a field of view which is perpendicular to the major faces but wherein each generally planar surface interface between the corresponding pair of adjacent optically transmissive optical elements randomly redirects light so that the image is blurred outside the field of view.

2. The light control sheet of claim 1 wherein the sheet comprises an array of a plurality of optical elements, wherein the optical elements:

(1) have an elongate form with opposing first and second base sides and two opposing lateral sides, each lateral side connecting the first base side and the second base side of the optical element and each lateral side defining a disruptive optical interface;
(2) are light transmissive between the first base side and the second base side;
(3) are disposed in substantially parallel arrangement to one another within the array such that adjacent optical elements are spaced apart from adjacent optical elements by a light transmissive separation gap having opposing first and second base sides and two opposing lateral sides, each lateral side connecting the first base side and second base side of the separation gap.

3. The light control sheet of claim 2 wherein the optical elements are of substantially uniform size and shape.

4. The light control sheet of claim 2 wherein the separation gaps are of substantially uniform size and shape.

5. The light control sheet of claim 2 wherein the spacing between adjacent optical elements is uniform.

6. The light control sheet of claim 2 further comprising a base member having first and second major sides, wherein the array of optical elements is disposed on the first major side of the base member wherein the first base sides of the optical elements are optically coupled with the base member.

7. The light control sheet of claim 2 wherein the base member and the array of optical elements are integrally formed.

8. The light control sheet of claim 2 wherein the array of optical elements is in substantially planar configuration.

9. A privacy film comprising a light control sheet of claim 1.

10. The light control sheet of claim 1 wound into roll form.

11. A device having a display and comprising a light control sheet of claim 1 on the display.

* * * * *